(12) United States Patent
Xia (10) Patent No.: US 7,972,413 B2
(45) Date of Patent: Jul. 5, 2011

(54) PRECIOUS METAL RECOVERY FROM SOLUTION

(75) Inventor: Chen Xia, Ottawa (CA)

(73) Assignee: Metal Asia International Ltd. (CN)

( * ) Notice: Subject to any disclaimer, the term of this patent is extended or adjusted under 35 U.S.C. 154(b) by 154 days.

(21) Appl. No.: 12/296,159

(22) PCT Filed: Apr. 5, 2007

(86) PCT No.: PCT/CA2007/000566
§ 371 (c)(1),
(2), (4) Date: Jan. 9, 2009

(87) PCT Pub. No.: WO2007/115399
PCT Pub. Date: Oct. 18, 2007

(65) Prior Publication Data
US 2010/0025259 A1    Feb. 4, 2010

Related U.S. Application Data (60) Provisional application No. 60/789,912, filed on Apr. 7, 2006.

(51) Int. Cl.
C22B 3/06 (2006.01)
C22B 11/00 (2006.01)
(52) U.S. Cl. .......................................... 75/724; 75/741
(58) Field of Classification Search .............. 75/724, 75/741
See application file for complete search history.

(56) References Cited

U.S. PATENT DOCUMENTS

| | | |
|---|---|---|
| 4,023,961 A | 5/1977 | Douglas et al. |
| 4,070,182 A | 1/1978 | Genik-Sas-Berezowsky et al. |
| 4,167,481 A | 9/1979 | Cremers et al. |
| 4,269,622 A | 5/1981 | Kerley |
| 4,369,061 A | 1/1983 | Kerley |
| 4,654,078 A | 3/1987 | Perez et al. |
| 4,654,703 A | 3/1987 | Viera |
| 4,913,730 A * | 4/1990 | Deschenes et al. ............. 75/370 |
| 5,279,803 A * | 1/1994 | Clough ......................... 423/22 |
| 5,354,359 A | 10/1994 | Wan et al. |
| 5,389,262 A | 2/1995 | Guess |
| 5,536,297 A | 7/1996 | Marchbank et al. |

(Continued)

FOREIGN PATENT DOCUMENTS

CN    1818098    8/2006

(Continued)

OTHER PUBLICATIONS

Aylmore and Muir, "Thiosulfate leaching of gold: A review", Minerals Engineering, 14(2): 135-174 (2001).

(Continued)

*Primary Examiner* — George Wyszomierski
*Assistant Examiner* — Tima M McGuthry-Banks
(74) *Attorney, Agent, or Firm* — Rader, Fishman & Grauer PLLC (57) ABSTRACT

A method for recovering precious metals such as gold and silver from aqueous solution as solid is described The method includes mixing an aqueous solution (e.g., thiosulfate or thiocyanate lixiviant) containing precious metals with ferrous ions in the presence of an effective amount of hydroxide ions. The precious metal ions are reduced and co-precipitate with iron hydroxides and/or hydrated iron oxides The co-precipitate is collected and purified. De-oxygenation of the reaction solution is optional. The recover/method is fast, complete and clean.

37 Claims, 8 Drawing Sheets

U.S. PATENT DOCUMENTS

| | | | |
|---|---|---|---|
| 5,785,736 | A | 7/1998 | Thomas et al. |
| 5,916,534 | A | 6/1999 | Butler |
| 6,344,068 | B1 | 2/2002 | Fleming et al. |
| 6,500,231 | B1 | 12/2002 | Wan |
| 6,632,264 | B2 | 10/2003 | Zhang et al. |
| 6,660,059 | B2 | 12/2003 | Ji et al. |
| 7,004,326 | B1 | 2/2006 | Dai et al. |
| 2003/0154822 | A1 | 8/2003 | Hall et al. |
| 2004/0115108 | A1 | 6/2004 | Hackl et al. |
| 2004/0200207 | A1 | 10/2004 | McKelvey et al. |
| 2004/0206207 | A1 | 10/2004 | Ji et al. |
| 2004/0237721 | A1 | 12/2004 | Baghalha |
| 2007/0014709 | A1 | 1/2007 | Moyes et al. |
| 2010/0116092 | A1 | 5/2010 | Xia et al. |

FOREIGN PATENT DOCUMENTS

| | | |
|---|---|---|
| WO | WO2005/017215 | 2/2005 |
| WO | WO2007/098603 | 9/2007 |

OTHER PUBLICATIONS

Fleming, C.A., et al., "Recent advances in the development of an alternative . . . resin in pulp", Minerals & Metallurgical Processing, 20(1): 1-9 (2003).

Klut, "The recovery of gold, silver and platinum residues", Pharmazeutische Zeitung, 52:168 (1907)—English abstract.

Klut, "The recovery of gold, silver and platinum residues", Pharmazeutische Zeitung, 52:168 (1907)—English translation.

Klut, "The recovery of gold, silver and platinum residues", Pharmazeutische Zeitung, 52:168 (1907)—German paper.

Muir, D.M., et al., "Thiosulfate as an alternative to cyanide . . . impediments", Mineral Pro. & Extractive Metallurgy (Trans. Inst. Min. Metall. C), 113: C2-C12 (Mar. 2004).

Nicol, M., et al., "Recovery of gold from thiosulfate solutions and . . . resins", Cyanide: social, industrial and economic aspects, TMS, Warrendale, PA, 469-483 (2001).

Stanley, Norm, "Make your own chemicals: Recovery of gold", www.sas.org/E-Bulletin/2003-10-31/labNotes2/body.html, (2003).

Wassink, B., et al., "Leaching of a gold ore using the hydrogen sulfide-bisulfide-sulfur system", Met.Soc. CIM, Alberta: 225-241 (2005).

West-Sells, P.G., et al., "A novel thiosulfate leach process for the treatment of carbonaceous gold ores", Met.Soc. CIM, Alberta: 209-223 (2005).

Xia, C., et al., "Iron sulfide minerals in thiosulfate-gold leaching: some problems and solutions", Met.Soc. CIM, Alberta: 259-278 (2005).

Zhang, H., et al., "An electrochemical study of an alternative process . . . thiosulfate solutions", Met.Soc. CIM, Alberta: 243-257 (2005).

International Search Report for corresponding PCT/CA2007/000566, Sep. 3, 2008.

Written Opinion of International Searching Authority for corresponding PCT/CA2007/000566 Sep. 3, 2008.

International Search Report for PCT/CA2007/000337 (Xia, et al.) Sep. 3, 2008.

International Perliminary Report on Patentability for PCT/CA2007/000337 (Xia, et al.), Sep. 3, 2008.

\* cited by examiner

1. Adjust concentration of hydroxide in solid-free pregnant lixiviant solution.

1a. OPTIONAL
De-oxygenate solution

2. Add ferrous salt to solution, agitate and collect precipitate.

⇢ Solution removed to waste disposal or reused in separate leaching process.

2a. OPTIONAL
Leach copper impurities from the co-precipitate by washing with ammonia.

2b. OPTIONAL
Remove oxides from the co-precipitate by digesting in acid.

3. Purify precipitate. Obtain purified precious metal.

PRECIOUS METAL RECOVERY FROM SOLUTION

CROSS-REFERENCE TO RELATED APPLICATION

This application claims the benefit under 35 U.S.C. s.119(e) of U.S. of America Provisional Patent Application Ser. No. 60/789,912 filed Apr. 7, 2006, the contents of which is hereby incorporated by reference in its entirety.

FIELD OF THE INVENTION

The invention relates to a method for recovery of precious metals from aqueous solution. The invention more particularly relates to precious metal recovery from leachate. The invention further relates to a method of recovering gold and silver from leachates. The invention also relates to a method of recovering silver and gold from leachates of thiosulfate ions and/or thiocyanate ions.

BACKGROUND OF THE INVENTION

Precious metal extraction involves the use of compounds called lixiviants to leach (or lixiviate) precious metals from ore. A commonly used lixiviant of the last century is cyanide. Cyanide is a highly toxic compound that is capable of causing tremendous damage to the environment. If cyanide pollutes water sources, it can kill local livestock and people. Processes that use cyanide are costly due to the requirement that all effluents that contain cyanide must be cleaned up prior to their release. Due to this costliness combined with public pressure for more environmentally-conscious processes, the use of lixiviants other than cyanide is being investigated. Such alternative lixiviants include thiocyananates, thioureas, halogens, and thiosulfates.

Thiosulfate is a promising replacement for cyanide in the precious metal extraction industry since thiosulfate lixiviants are safer and less expensive than toxic cyanide. Leaching gold from gold ore using thiosulfate leaching solution provides fast reaction rates, a high recovery of gold into the leaching solution, and a low unit cost (Muir, 2001). Gold dissolution in thiosulfate solution in the presence of a copper-ammonia catalyst can be as fast as cyanidation (Thomas, 1998). Thiosulfate leaching is particularly effective relative to other lixiviants, for leaching gold from carbonaceous ores.

Recovery of dissolved gold from thiosulfate leaching solutions can be problematic. Currently, techniques to recover gold from thiosulfate leachates include activated carbon adsorption, resin exchange, metal cementation, non-metal precipitation and solvent extraction. Problems that are associated with these methods include: gold thiosulfate complexes exhibit a low affinity for activated carbon surfaces; some resin surfaces are inhibited by degradation products of thiosulfate (Fleming, 2003; Nicol et al., 2001); and cementation techniques that use zinc, copper, iron and aluminum involve high reagent costs and both their recovered solid products and their barren solutions may be contaminated with these metals. A copper precipitation method has been described in U.S. Pat. No. 5,354,359, wherein fine copper particles are used to precipitate gold. This method can suffer from high reagent cost, incomplete recovery and complications caused by dissolved copper.

A gold recovery process is described in U.S. Pat. No. 4,913,730 wherein gold is recovered from pregnant aqueous solution by contacting the solution with hydrogen gas until the gold precipitates. This process reduces the gold ion to gold of oxidation state zero (elemental gold). The requirement to have hydrogen gas present in large quantities in remote areas is difficult and can be a safety hazard.

Thus there is a need for a method that can economically and efficiently recover precious metals such as gold and silver from thiosulfate leaching solutions.

SUMMARY OF THE INVENTION

According to a first aspect, the invention provides a method for recovering precious metal in solid form from an aqueous solution containing precious metal ions, comprising the steps of combining an aqueous solution containing precious metal ions of about pH 7 or higher with ferrous ions, and collecting solid containing precious metal. The aqueous solution may be about pH 7 to about pH 14. The precious metal may be gold. The precious metal may be silver.

According to a second aspect, the invention provides a method for recovering precious metal in solid form from an aqueous solution containing precious metal ions and lixiviant, comprising the steps of combining an aqueous solution containing precious metal ions and lixiviant with ferrous ions, wherein the aqueous solution, the resulting mixture or both is about pH 7 or higher; and collecting solid containing precious metal. The aqueous solution, the resulting mixture or both may be about pH 7 to about pH 14. The aqueous solution, the resulting mixture or both may be about pH 8 to about pH 12.

The method may further comprise the step of adding base to the aqueous solution containing precious metal and lixiviant prior to combining said solution with ferrous ions. After the addition of base, the aqueous solution, the resulting mixture or both may be about pH 7 to about pH 14. After the addition of base, the aqueous solution, the resulting mixture or both may be about pH 8 to about pH 12. The base may be ammonia, NaOH, KOH, (CaO, Ca(OH)$_2$, CaCO$_3$, Na$_2$CO$_3$, KCO$_3$, or a combination thereof.

According to this aspect of the invention, the precious metal may be gold. The precious metal may be silver. The lixiviant may be thiosulfate. The lixiviant may be thiocyanate.

According to the first or second aspects of the invention, the method may further comprise the step of purifying elemental precious metal from the solid containing precious metal.

The purifying step may comprise treating the solid with an acidic solution. The acidic solution may comprise hydrochloric acid, nitric acid, sulfuric acid, hydrochloric and sulfuric acids, or nitric and sulfuric acids.

The purifying step may comprise electrowinning after redissolving, smelting, refining, or a combination thereof.

In some embodiments of the first and second aspects of the invention, the aqueous solution further contains copper ions and said step of purifying elemental precious metal from the solid comprises treating the solid containing precious metal with a copper complexing agent and removing a resulting copper complex. The copper complexing agent may comprise ammonia, glycine, ethylenediamine or a combination thereof.

In various embodiments of the first and second aspects of the invention, the method may further comprise agitating the mixture.

In various embodiments of the first and second aspects of the invention, the method may further comprise de-oxygenating the aqueous solution or the aqueous solution that has been combined with ferrous ions. Said de-oxygenating may comprise bubbling with a gas that has substantially no oxygen; placing the aqueous solution under reduced pressure; and/or covering the aqueous solution, the aqueous solution that has been combined with ferrous ions, or both with a blanket of gas that has little to no oxygen.

In various embodiments of the first and second aspects of the invention, an excess of Fe(II) or other reducing agent may be provided in the aqueous solution or in the mixture.

According to a third aspect, the invention provides a method for recovering precious metal in solid form from an aqueous solution containing precious metal ions, comprising the steps of combining an aqueous solution containing precious metal ions of about pH 7 to about pH 14 with ferrous ions, and collecting solid containing precious metal. The precious metal may be gold. The precious metal may be silver.

According to a fourth aspect, the invention provides a method for recovering precious metal in solid form from an aqueous solution containing precious metal ions and lixiviant, comprising the steps of combining an aqueous solution containing precious metal ions and lixiviant with ferrous ions, the resulting mixture being about pH 7 to about pH 14; and collecting solid containing precious metal. The resulting mixture may be about pH 8 to about pH 12. The method may further comprise the step of purifying elemental precious metal from the solid containing precious metal.

The method may further comprise the step of adding base to the aqueous solution containing precious metal and lixiviant prior to combining said solution with ferrous ions. After adding base, the resulting mixture may be about pH 8 to about pH 12. The base may be ammonia, NaOH, KOH, CaO, $Ca(OH)_2$, $CaCO_3$, $Na_2CO_3$, $KCO_3$, or combinations thereof.

The precious metal may be gold. The precious metal may be silver.

The lixiviant may be thiosulfate. The lixiviant may be thiocyanate.

The aqueous solution may further contain copper ions. The step of purifying elemental precious metal may comprise treating the solid containing precious metal with a copper complexing agent and removing the resulting copper complex. The copper complexing agent may comprise ammonia, glycine, ethylenediamine or a combination thereof. The method may further comprise agitating the mixture.

The method may further comprise the step of de-oxygenating the aqueous solution. De-oxygenating may comprise bubbling with a gas that has substantially no oxygen. De-oxygenating may comprise placing the aqueous solution under reduced pressure. De-oxygenating may comprise covering the aqueous solution or the aqueous solution that has been combined with ferrous ions with a blanket of gas that has little to no oxygen, or both.

The method may comprise providing an excess of Fe(II) or other reducing agent in the aqueous solution or the mixture.

The step of purifying elemental precious metal from the solid may comprise treating the solid with an acidic solution. The acid solution may comprise hydrochloric acid, nitric acid, sulfuric acid, or a combination thereof.

The step of purifying elemental precious metal from the solid may comprise electrowinning after redissolving, smelting, refining, or a combination thereof.

BRIEF DESCRIPTION OF THE DRAWINGS

Embodiments of the invention will now be described, by way of example, with reference to the accompanying drawings.

A: 1.2 mL of 50 g/L ferrous sulfate solution was added to 50 mL of 1.93 ppm gold ion (leached from gold ore) in leachate that was 0.2 mol/L ammonium thiosulfate, 300 mg/L copper sulfate, and 0.9 mol/L ammonia. The amount of ferrous sulfate added was 1.2 g/L.

B: 5 mL of 50 g/L ferrous sulfate solution was added to 50 mL of 5.12 ppm gold ion (leached from gold ore) in leachate that was 0.2 mol/L ammonium thiosulfate, 300 mg/L copper sulfate, and 0.9 mol/L ammonia. The amount of ferrous sulfate that was added was 5.0 g/L.

C: 2.4 mL of 50 g/L ferrous sulfate solution was added to 50 mL of 5.3 ppm gold ion (prepared by dissolving gold salt in a thiosulfate solution that was 0.067 mol/L ammonium thiosulfate, 240 mg/L copper sulfate, and 0.12 mol/L ammonia). The amount of ferrous sulfate added was 2.4 g/L.

D: 3.2 mL of 50 g/L ferrous sulfate solution was added to 50 mL of 17.50 ppm gold ion (prepared by dissolving gold salt) in a thiosulfate solution that was 0.033 mol/L ammonium thiosulfate, 100 mg/L copper sulfate, and 0.12 mol/L ammonia). The amount of ferrous sulfate that was added was 3.2 g/L.

E: 3.2 mL of 50 g/L ferrous sulfate solution was added to 50 mL of 21.27 ppm gold ion (prepared by leaching gold ore and adding gold salt to the filtered leachate) in a solution that was 0.2 mol/L ammonium thiosulfate, 300 mg/L copper sulfate, and 0.9 mol/L ammonia). The amount of ferrous sulfate that was added was 3.2 g/L.

FIG. 4 graphically depicts the effect of the amount of ferrous sulfate added on the amount of gold recovered. In these trials, an aliquot of known volume of 50 g/L ferrous sulfate solution was added to:

A: 50 mL of 1.93 ppm gold ion (from gold ore in leachate) wherein the amount of ferrous sulfate added was 0.8~3.2 g/L;

B: 50 mL of 5.12 ppm gold ion (from gold ore in leachate) wherein the amount of ferrous sulfate added was 0.8 to 4.8 g/L;

C: 50 mL of 5.3 ppm gold ion (from gold salt dissolved in 0.067 mol/L ammonium thiosulfate, 240 mg/L copper sulfate, and 0.12 mol/L ammonia) wherein the amount of ferrous salts that was added varied from 0.8 to 5.6 g/L;

D: 50 mL of 17.50 ppm gold ion (from gold salt dissolved in 0.033 mol/L ammonium thiosulfate, 100 mg/L copper sulfate, and 0.12 mol/L ammonia) wherein the amount of ferrous salt used in these trials was 1.6~6.4 g/L; and E: 50 mL of 21.27 ppm gold ion (from gold ore in leachate and dissolving additional gold salt in the filtered pregnant leachate) wherein the amount of ferrous sulfate added was 1.6 to 6.4 g/L.

DETAILED DESCRIPTION OF THE PREFERRED EMBODIMENTS

The term "pregnant" as used herein is intended to mean containing dissolved precious metal. The term "ferrous salt" means salts of Fe(II) that are substantially soluble in aqueous solution. The term "barren" means formerly containing a dissolved precious metal, which includes possibly containing a remaining trace amount of precious metal. The term "co-precipitate" means two precipitates that drop out of solution together but that are not covalently bonded to one another. As used herein, the term "filtrate" broadly means the liquid product of a separation, e.g., filtration, decantation or centrifugation. The term "deoxygenate" means to reduce the concentration of dissolved oxygen.

The precious metal recovery method described herein provides a co-precipitation wherein an aqueous solution of ferrous salt(s) is combined with an aqueous solution that contains precious metal ions and hydroxide ions. At the time that ferrous ions encounter the precious metal ions, a co-precipitate forms that is made up of precious metal in solid form and iron hydroxides and/or iron oxides, which may be hydrated. The reaction is rapid and substantially all of the precious metal ions from the pregnant solution are recovered in solid form. This method is suitable for recovering precious metals from solutions such as leachates in which they are present in low, or even very low, concentrations. Leachates may contain thiocyanates, thioureas, halogens, thiosulfates, or combinations thereof. It is reasonable to expect that the method is effective at recovering precious metals from aqueous solutions of thioureas and/or halogens. These lixiviants are not preferred because of the increased expense of their use. This method is highly effective at recovering gold and silver from thiosulfate and/or thiocyanate solutions.

In preferred embodiments of the invention, the ferrous ion source is ferrous salt(s). Preferably, the ferrous salt(s) is dissolved in water and the resulting aqueous solution is added to the pregnant solution.

In other embodiments of the invention, the ferrous ion source is generation of ferrous ions from other iron containing species. An example of such ferrous ion generation includes reacting ferric ions with a reducing agent to produce ferrous ions. Such reducing agents include, for example, hydrogen gas, hydrogen sulfide, or zinc. Another example is generation of ferrous ions from oxidative treatment of iron sulfide minerals.

Without wishing to be bound by theory, the inventor offers the following non-limiting explanation for the effectiveness of the precious metal recovery method. Once added to the pregnant solution, ferrous ions react with any precious metal ions in a redox (reduction/oxidation) reaction wherein the precious metal ions are reduced. The reduction/oxidation reactions of ferrous ion and gold and silver ions, are depicted below in Schemes 1 and 2.

$$Au(I) + Fe(II) \rightarrow Au(0) + Fe(III) \quad (1)$$

$$Ag(I) + Fe(II) \rightarrow Ag(0) + Fe(III) \quad (2)$$

For simplification purposes, only the metals and their oxidation states are depicted in Schemes 1 and 2 since, as one skilled in the art will recognize, when ferrous salt is in aqueous solution, many different species may be present. Fe(II) may be present as, for example, $Fe^{2+}$, $Fe(OH)^+$, $Fe(OH)_2$, and $HFeO_2^-$. Fe(III) may be present as, for example, $Fe^{3+}$, $Fe(OH)_3$, $Fe(OH)O$, and $FeO_2^-$. Au(I) and Ag(I) may be present in thiosulfate solution as, for example, $Au(S_2O_3)_2^{3-}$ and $Ag(S_2O_3)_2^{3-}$. Au(0) is present as elemental gold. Ag(0) is present as elemental silver. It should be recognized that Fe(II) is less soluble in alkaline solution than neutral or acidic solutions. In certain embodiments of the invention, a proportion of the Fe(II) starting material may also co-precipitate with the precious metal and Fe(III), particularly if the combining step involves a significant increase in pH for the iron-containing solution; such co-precipitation of Fe(II), though not expected to be a dominant result, is not excluded from the invention.

In the above-depicted redox reactions, each ferrous ion gives up an electron and each precious metal ion receives an electron. The products of the reaction are a precious metal atom of oxidation state zero, and a ferric ion. The precious metal atom is not well solubilized; thus it precipitates from solution in solid form. At the same time, ferric ions are in the presence of hydroxide ions, which leads to their rapid precipitation from solution as ferric hydroxide and/or hydrated ferric oxides. Given the simultaneous and co-localized precipitation reactions, elemental precious metal and iron hydroxide or oxide form a co-precipitate.

The ferric hydroxide precipitate provides a large surface area with which the precious metal atom can become associated and/or entrapped. The co-precipitate flocculates and collects at the bottom of the reaction vessel. It is beneficial to recovery efficiency if the co-precipitate is separated from the solution as soon as possible to prevent oxidation of and redissolution of the precious metal. If immediate separation is not feasible, loss of the precious metal to redissolution can be minimized by preventing its oxidation, as described below. Once isolated, the recovered precious metal in the co-precipitate is purified to obtain pure precious metal.

The precious metal recovery method described herein provides an improved method for extracting precious metals, e.g., gold and/or silver, from leachates and in particular from thiosulfate or thiocyanate leachates. Prior to performing the precious metal co-precipitation method on a pregnant leachate, any fine particulate matter is preferably removed, for example, by filtration.

Figure 1:
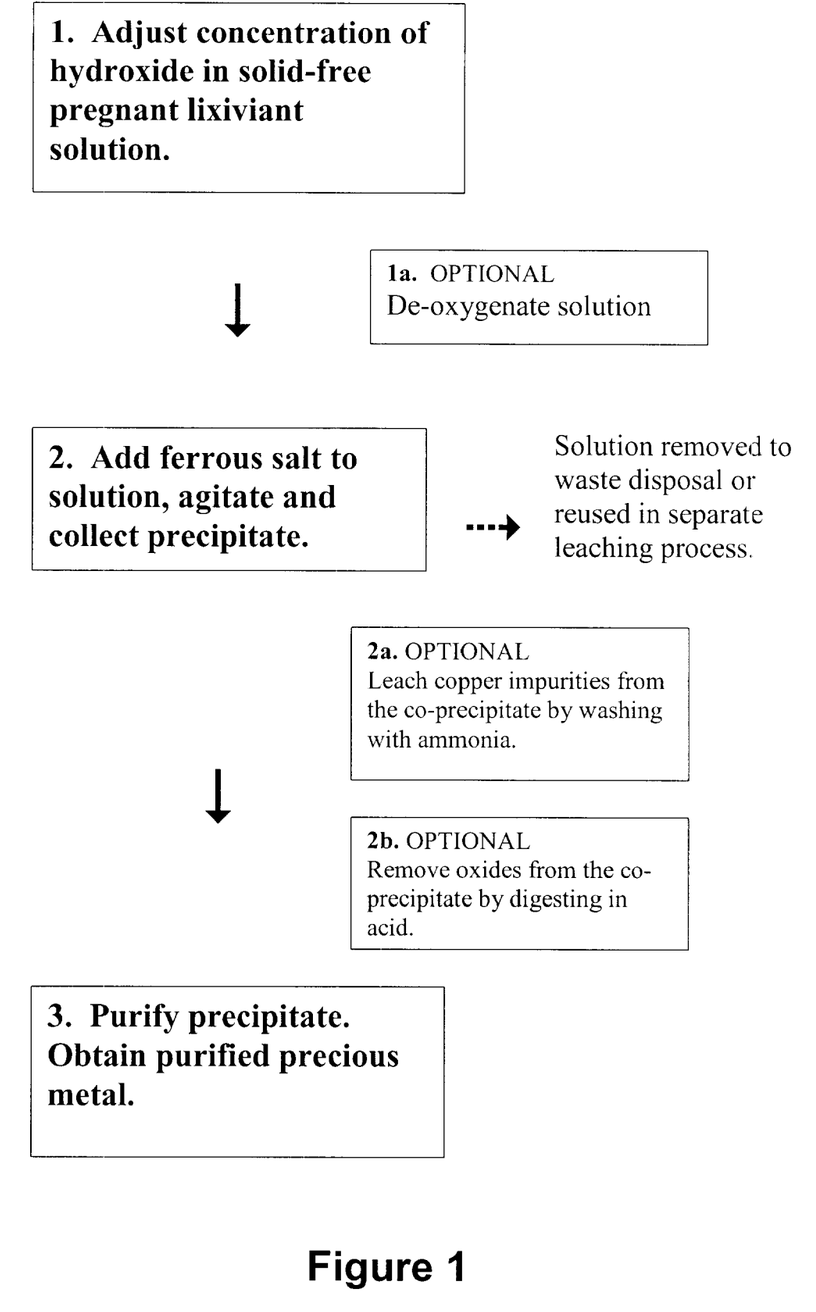
FIG. 1 is a flow chart of the precious metal recovery method described herein.
Figure 2A:
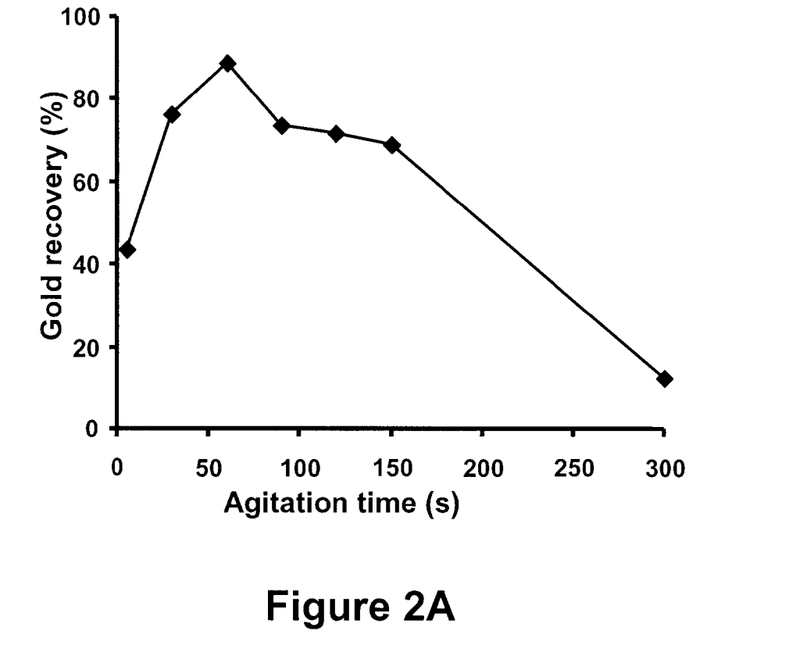
FIG. 2 graphically depicts the effect of agitation time on the amount of gold recovered. In these trials.
Figure 2B:
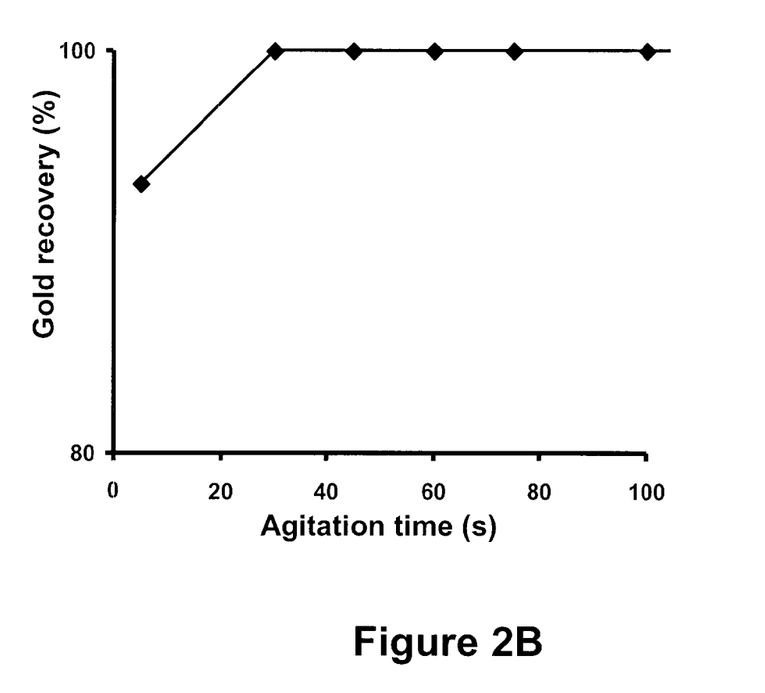
Figure 2C:
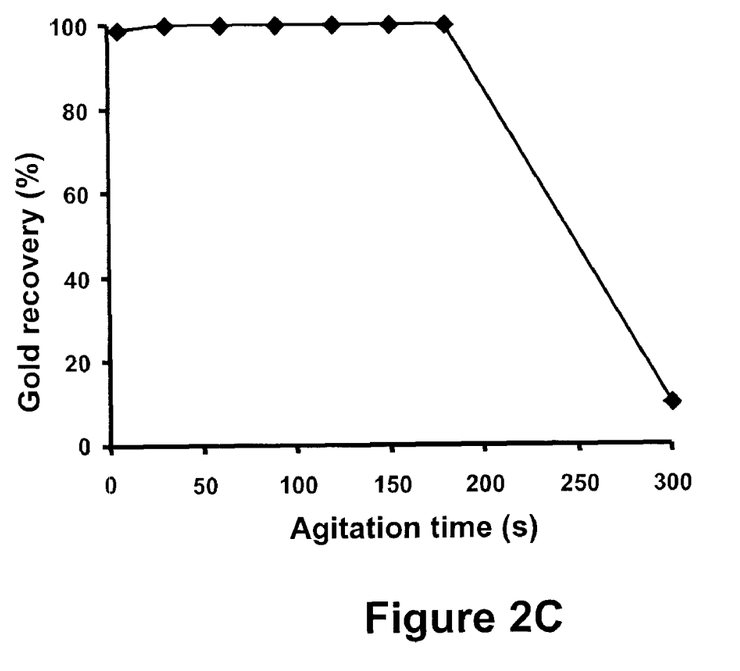
Figure 2D:
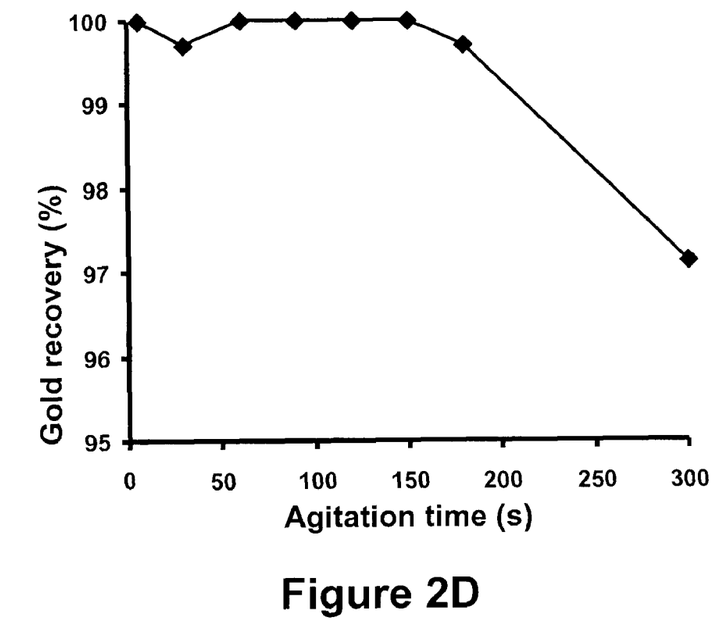
Figure 2E:
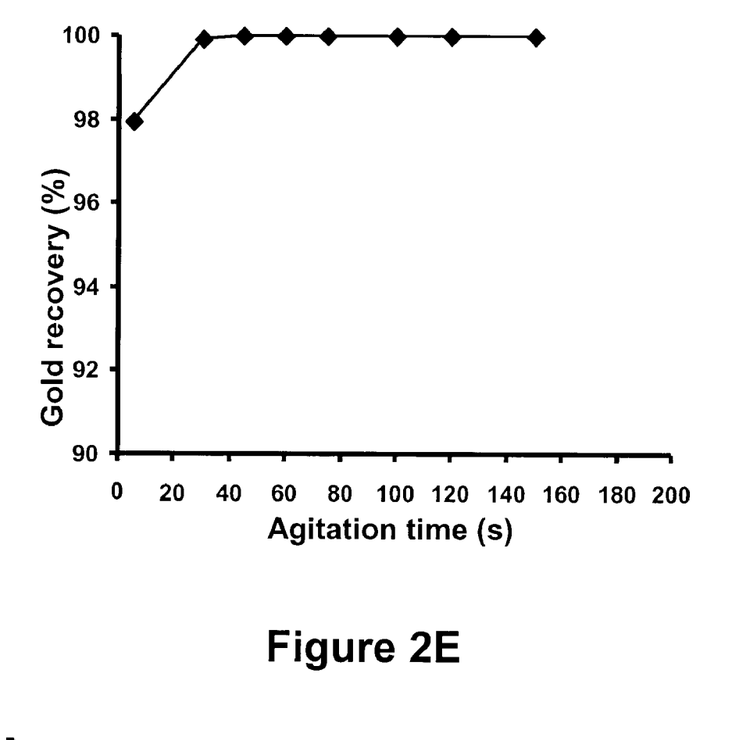

FIG. 1 depicts in schematic form a preferred embodiment of the invention. As precious metal leachates may be acidic, Box 1 shows initial adjustment of the concentration of hydroxide ion in a pregnant solid-free leachate. (Regarding the presence of hydroxide ions in the reaction solution, a person skilled in the art of the invention will recognize that aqueous solutions contain trace amounts of hydroxide ions and hydrogen ions; water of pH 7, by definition, has a concentration of both of these ions of $1 \times 10^{-7}$ mol/L.) Conveniently, the hydroxide concentration of the solution may be adjusted by adding a base. It is not necessary to make the solution alkaline, as long as there is sufficient hydroxide ion in solution for the ferric ions that will be generated to precipitate readily. Thus, pH is about 7 or higher, preferably about 8 or higher. A suitable pH range is about 7 to about 14. Preferably the pH range is about 8 to about 14, still more preferably about 8 to about 12. Without limitation, examples of suitable bases to add are: ammonia, NaOH, KOH, CaO, Ca(OH)$_2$, CaCO$_3$, and Na$_2$CO$_3$, or combinations thereof. Preferred bases are carbonate salts and ammonia. As one skilled in the art of the invention will recognize, the concentration of hydroxide ion in a solution can be stabilized by buffering the solution. Stabilizing the concentration of hydroxide ions by the presence of buffers in the aqueous solution may enhance the long-term efficiency of the recovery method.

Box 1a of FIG. 1 is an optional step in the method, de-oxygenating the solution. This is preferably performed before the leachate is combined with ferrous ions, but continuing to retain substantially oxygen-free conditions thereafter is not excluded. By reducing the amount of oxygen in the solution, less ferrous salt will be consumed by competing reactions. By preventing such reactions, substantially all of the ferrous salt that is combined with the pregnant leachate will be available for the redox reaction with precious metal ions. The solution may be de-oxygenated, for example, by placing it under reduced pressure, or by bubbling the solution with a non-reactive gas that contains little to no oxygen. Examples of such gases are carbon dioxide, nitrogen, argon, air in which the oxygen component has been reduced or removed, or combinations thereof. Alternatively and/or additionally, the solution may be covered in a blanket of gas that has little to no oxygen, and/or may be capped to prevent oxygen from entering the solution. De-oxygenating the solution will decrease the amount of ferrous salt needed to recover all of the precious metal. Although there is a cost associated with de-oxygenating, in some cases the recovery method may be more cost efficient with the optional de-oxygenation step, than without it.

Figure 7:
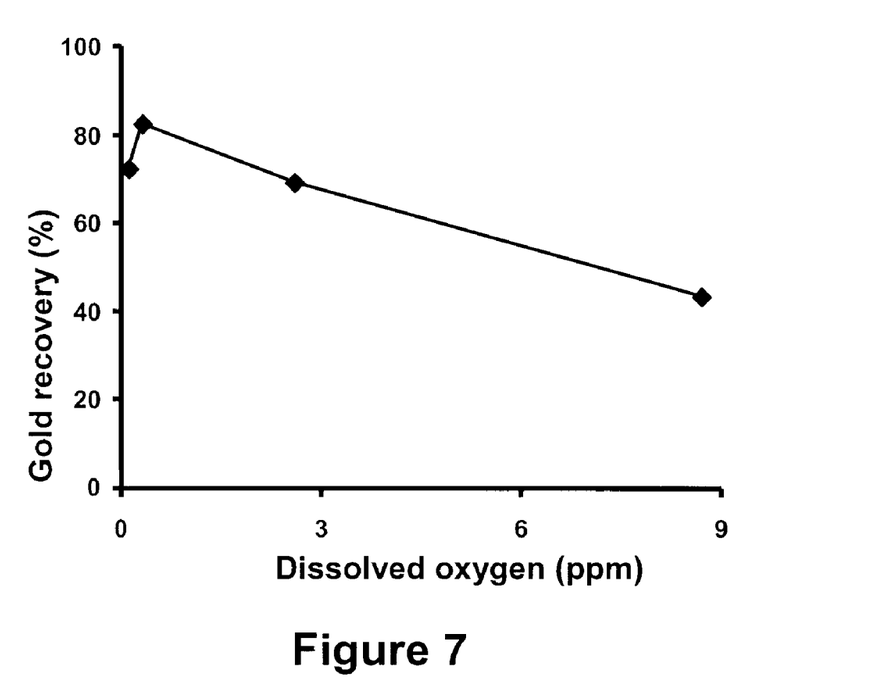
FIG. 7 graphically depicts the effect of dissolved oxygen concentration on the amount of gold recovered. In these trials, a 1.2 mL aliquot of ferrous sulfate solution was added to 50 mL of 1.93 ppm gold ion (from gold ore in leachate). Prior to adding the aliquot, the dissolved oxygen concentrations were set at 0.1 to 8.6 ppm, as indicated and as described herein. The amount of ferrous salts that was added was 1.2 g/L.

As shown graphically in FIG. 7, dissolved oxygen concentration is inversely proportional to the amount of gold recovered. This was expected since, with dissolved oxygen present, a portion of the ferrous ions can be consumed by oxidation with dissolved oxygen and thus be unavailable to participate in a reduction/oxidation reaction with precious metal ions. It is reiterated that the precious metal recovery method of the invention does not absolutely require de-oxygenating nor a protective blanket of gas in order to work.

As indicated at Box 2 of FIG. 1, ferrous ions are added to the optionally de-oxygenated, pregnant, hydroxide ion-containing leachate. Preferably, the resulting mixture ranges in pH from about 7 to about 14, more preferably from about 8 to about 14, still more preferably from about 8 to about 12. However, as a person of ordinary skill in the art will recognize, precipitation of iron hydroxide and iron oxide will reduce pH; thus, if for example the pH-adjusted pregnant leachate had a pH of about 7 prior to addition of the ferrous ions, the resulting mixture would be expected to have a lower pH post-precipitation.

Iron is particularly suited to the invention since it is capable of both reducing oxidized precious metal and precipitating with it. This is in contrast to copper; that is, although Cu(I) can reduce, for example, Au(I) in solution, it will not precipitate with it.

Figure 3:
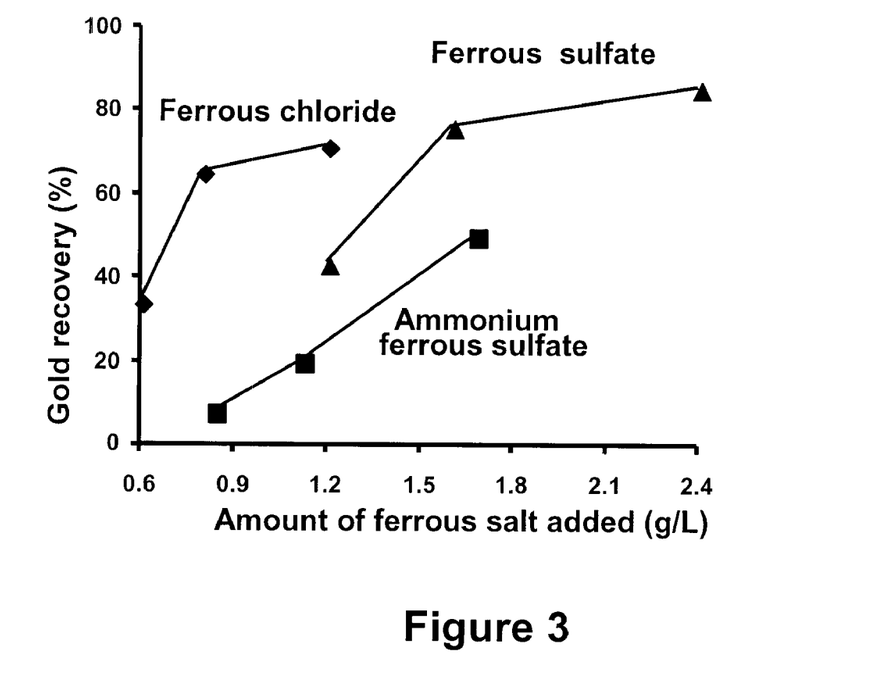
FIG. 3 graphically depicts the influence of the nature of the source of ferrous ion and the amount added on the amount of gold recovered. In these trials, a known volume of the following ferrous salt solutions was added to 50 mL of 1.93 ppm gold ion leachate: 50 g/L ferrous sulfate, 25 g/L ferrous chloride, and 35 g/L ammonium ferrous sulfate. The amount of ferrous salts added varied from 0.6 to 2.4 g/L.
Figure 4A:
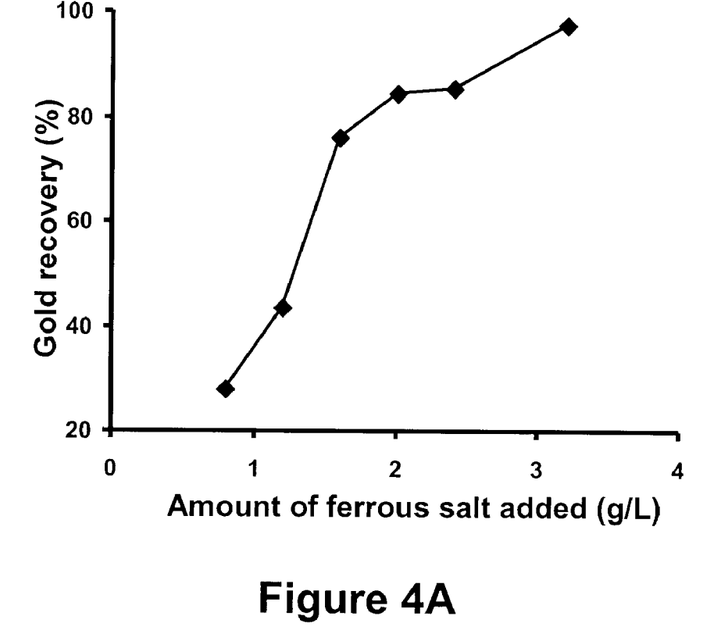
Figure 4B:
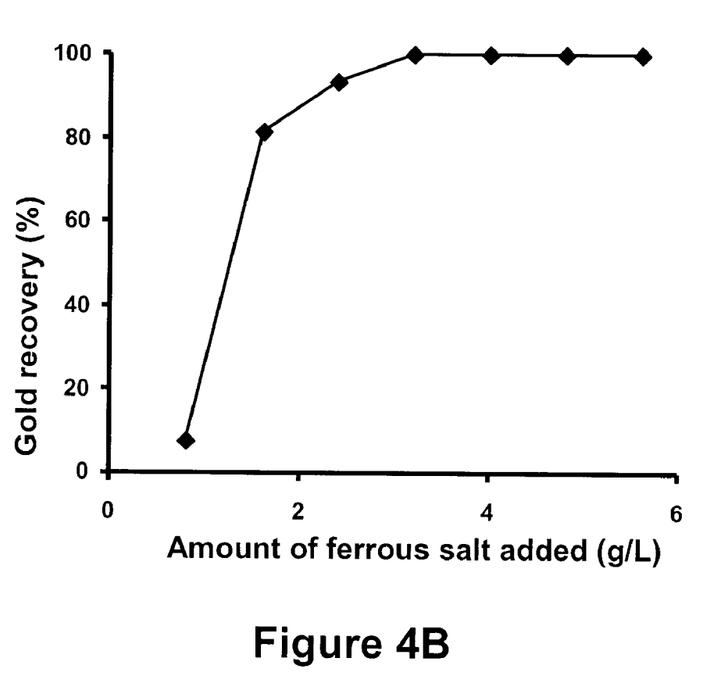
Figure 4C:
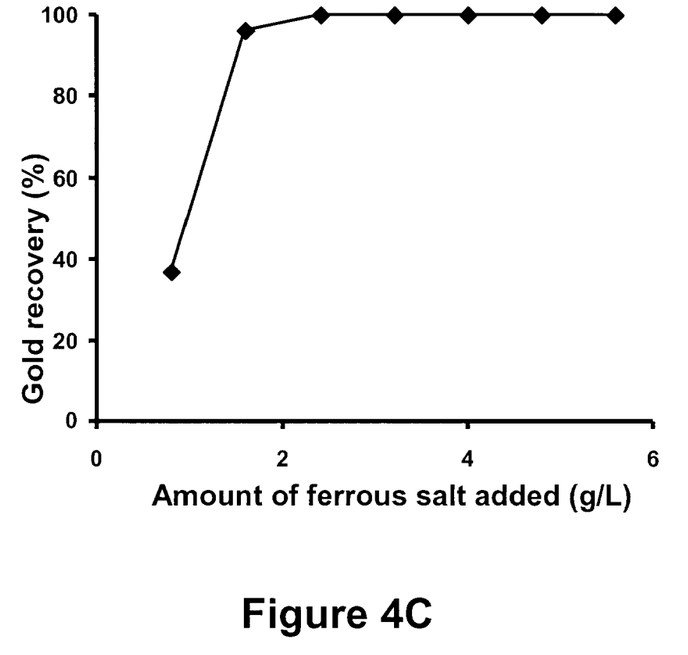
Figure 4D:
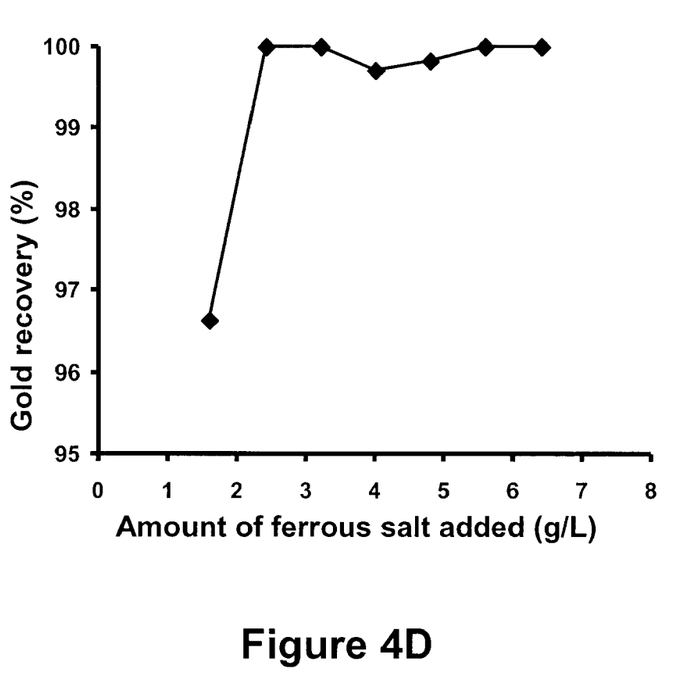
Figure 4E:
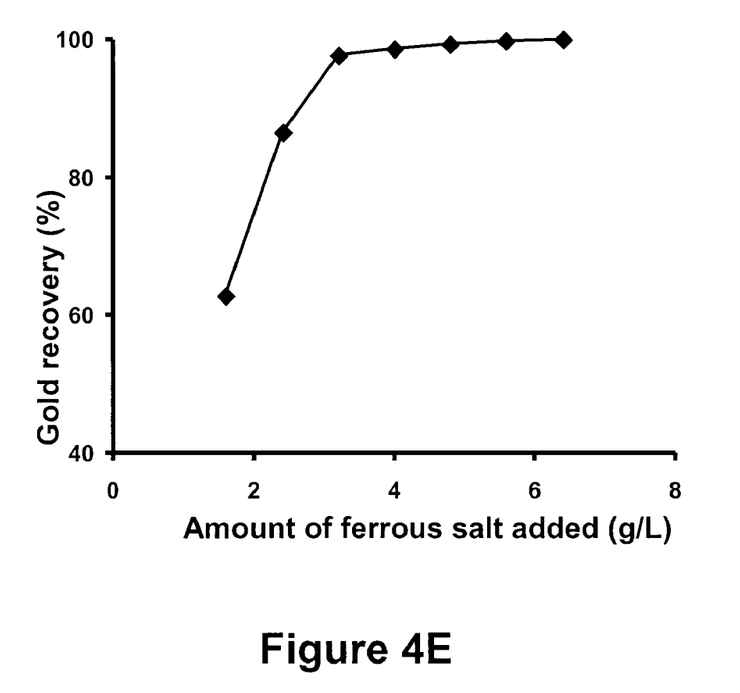

Ferrous salts that are useful in this method include any ferrous salt that is reasonably soluble in aqueous solution, such as, for example, ferrous sulfate, ammonium ferrous sulfate, and ferrous chloride. Studies were conducted to study the effect of each of these ferrous salts on the efficiency of gold recovery from gold and thiosulfate ion solutions; the results are depicted in FIG. 3.

Preferably, ferrous ion is added in the form of a substantially neutral aqueous solution, since the solubility of ferrous salt(s) is usually higher in neutral aqueous solution than it is in alkaline solution. If the ferrous salt were added to the pregnant leachate in solid form, the co-precipitation method would still occur; however it is expected that the amount of ferrous salt required to recover all of the precious metal would be substantially higher. It is expected that, upon addition of solid ferrous salt to the reaction solution, each granule of ferrous salt would become encrusted with ferric hydroxide. The ferric hydroxide crust would then seal off the ferrous salt molecules in the center of the granule from solution and inhibit complete dissolution of the ferrous ions. Accordingly, it is preferred that the ferrous salt be added as an aliquot of a concentrated, fully dissolved aqueous solution.

Both the amount of ferrous salt added and the quality affect the efficiency of the precious metal collection. The concentration of the ferrous salt solution that is added is limited only by the solubility of the particular ferrous salt reagent and the cost of the reagent. The quality of the ferrous salt solution refers to the age of the solution, and to the amount of oxidized iron species contained in it. The trials of the recovery method described herein used fresh ferrous sulfate solution. Ferrous sulfate is a preferred ferrous salt because of its low unit cost. It is commercially produced as a by-product of titanium dioxide manufacturing, as a by-product of the pickling of steel, and as a by-product in the pressure oxidation of iron sulfide minerals. Ferrous sulfate is non-hazardous and there is no difficulty in handling or storing the blue-green monoclinic crystals. Its solubility limit in water at 50° C. is 486 g/L. The concentration of the concentrated ferrous sulfate solution used in the trials described herein was 50 g/L. In preliminary studies, it was found that a small volume aliquot of a concentrated ferrous sulfate solution was more effective at recovering gold than a high volume aliquot of a more dilute ferrous sulfate solution, even when it was an equivalent amount of ferrous sulfate that was delivered to the reaction solution. Therefore, in a preferred embodiment of the invention, the ferrous solution that is combined with the solution containing dissolved precious metal is as concentrated as conveniently possible.

Studies were conducted to study the effect of the amount of ferrous ion added on recovery efficiency, and the results are presented graphically in FIGS. 3 and 4A-E. Better efficiency of gold recovery was found when the amount of ferrous ion added was high. In the studies described herein, the ratio of the amount of ferrous sulfate added to the final reaction volume varied from 1 to 6 g/L. Higher amounts of ferrous ion are preferred for embodiments of the invention that do not use de-oxygenation.

Also as indicated at Box 2 of FIG. 1, agitation of the solution is recommended. Although it is not essential, a short agitation time was found to benefit the amount of gold recovered in the conducted trials, as seen in FIGS. 2A-E wherein the agitation time was varied from 5 seconds to 5 minutes (300 seconds). These figures indicate that a prolonged amount of agitation decreased the amount of gold recovered. This was likely due to redissolution of gold from the co-precipitate. As discussed above, to minimize the amount of precipitated precious metals that are lost to redissolution, it is recommended that the co-precipitate be separated from the reaction solution as soon as possible after any agitation period is complete. Methods of separating the solid from the reaction solution include, for example, settling and decantation, centrifugation, and filtration. If it is desirable to delay filtration to allow the co-precipitate to flocculate and settle, it is recommended that oxidation of the solid precious metal be prevented by, for example, de-oxygenating the solution, or maintaining a sufficient concentration of reducing agent in the solution. Reducing agents include, for example, an excess of ferrous salt(s), e.g., Fe(II).

After the co-precipitate has been separated from the barren solution, substantially all of the precious metal is in solid form. For this reason, as seen to the right of Box 2 in FIG. 1, the barren solution is considered as waste and may optionally be disposed of or reused in a separate process wherein the barren solution is re-used to leach precious metals from ore.

When thiosulfate leachates are reused in a cycle of leaching process/precious-metal recovery method/leaching process, etc., the concentration of thiosulfate decreases over time and the concentration of its degradation products increases. The concentration of thiosulfate in the barren filtrate was determined by a standard iodometric titration (see Example 6).

Figure 5:
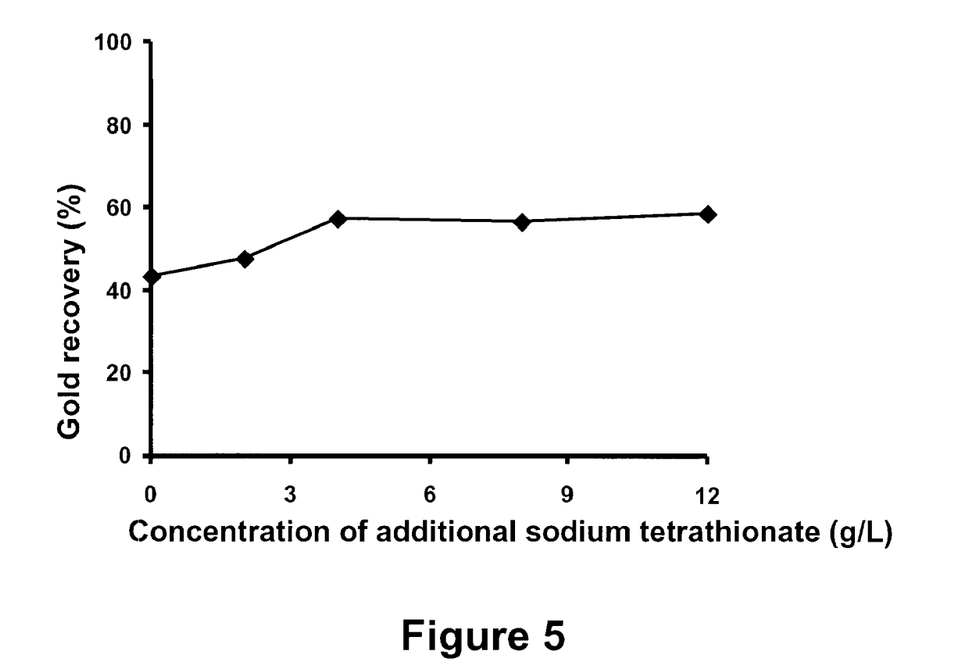
FIG. 5 graphically depicts the effect of additional sodium tetrathionate on the amount of gold recovered. In these trials, a 1.2 mL aliquot of 50 g/L ferrous sulfate solution was added to 50 mL of 1.93 ppm gold ion (from gold ore in leachate) spiked with a known amount of sodium tetrathionate to give a concentration of 0 to 12 g/L of additional tetrathionate (i.e., additional to the tetrathionate that is present due to degradation of thiosulfate). The amount of ferrous salts that was added was 1.2 g/L.
Figure 6:
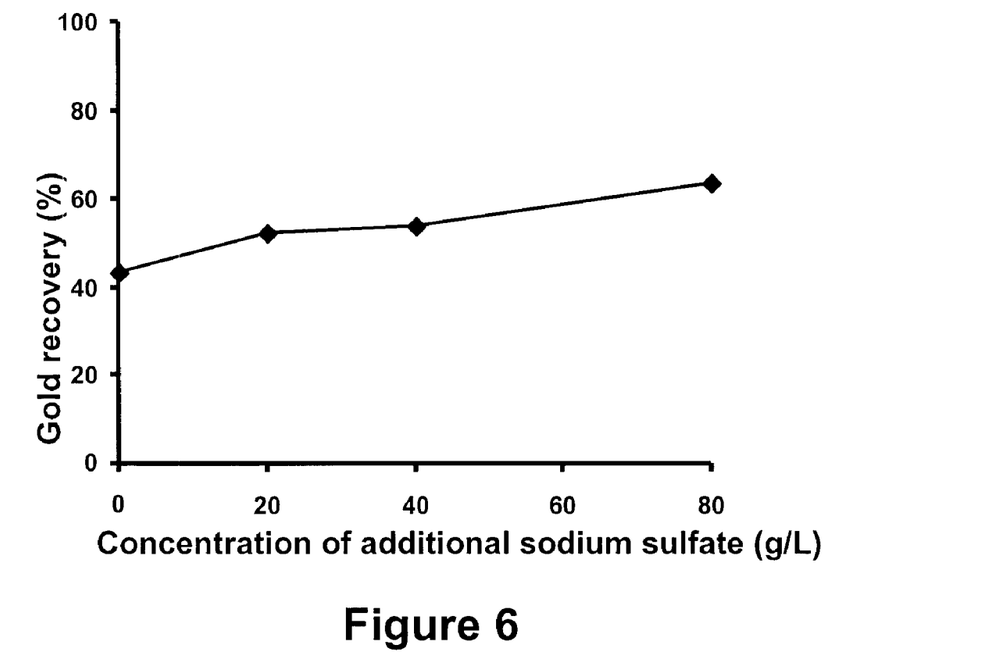
FIG. 6 graphically depicts the effect of additional sodium sulfate on the amount of gold recovered. In these trials, a 1.2 mL aliquot of ferrous sulfate solution was added to 50 mL of 1.93 ppm gold ion (from gold ore in leachate) spiked with a known amount of sodium sulfate to give 0 to 80 g/L of additional sulfate ion (i.e., additional to the sulfate ion that is present due to degradation of thiosulfate). The amount of ferrous salts that was added was 1.2 g/L.

The effect of the concentration of two of thiosulfate's degradation products, sulfate and tetrathionate ions, on the efficiency of the gold collection were studied. The results of such trials using pregnant solutions prepared from gold ore are shown in FIGS. 5 and 6, and using pregnant solutions prepared from gold salt are shown in Table 2. As seen in FIGS. 5 and 6, the increased concentration of both sulfate and tetrathionate ions improved the percentage of gold recovered.

Barren filtrate of the precious metal recovery method can act as an effective leachate of ore as shown by studies that are described in Example 10 and whose results are presented in Table 1. It was shown that the barren filtrate could leach gold ore as effectively as fresh leachate. When the leaching time was 3 hours, barren filtrate leached an equivalent amount of gold from an ore sample as the amount leached by fresh leachate. When the leaching time was 30 minutes, the amount of gold leached by fresh leachate was equivalent to the amount of gold leached by a barren filtrate that had been allowed to settle for 60 minutes after the gold collection step. It is expected that this 60 minute time period was beneficial to the leaching result since it allowed time for excess iron species to precipitate from the barren filtrate. Although this solid iron precipitate was not separated from the barren filtrate prior to use of the filtrate in the leaching process, the fact that the iron was no longer in solution may have improved the leaching performance. For this reason, it is recommended that if a filtrate of the precious metal collection step is to be reused in a leaching circuit, the filtrate be allowed time to settle after filtration of the co-precipitate, and before use of the barren filtrate in the ore leaching process. Alternatively, it may be desirable to speed up removal of iron species from the solution by adding an oxidant to the solution. Oxidation of iron species will remove excess iron species by precipitation. This removal of iron species will benefit the gold leaching process by improving the initial rate of gold dissolution from the gold ore into the leachate, and it may prevent difficulties in the separation of ore from leachate. However, removal of the iron species is optional. Such an oxidation can be performed, for example, by the addition of lime or another source of hydroxide. The oxidized products will precipitate and settle out of solution within 30 to 60 minutes and so can be easily removed from the leachate prior to its reuse in leaching. Leaching by recycled filtrate of the precious metal collection step was efficient, was unencumbered by thiosulfate degradation products, and was particularly efficient when excess iron had precipitated in the filtrate prior to its use in the leaching process.

Box 2a of FIG. 1 indicates an optional step wherein copper impurities are removed or partially removed from the co-precipitate by treating it with a complexing agent. In some cases, leachates have copper ions in them. Copper impurity in the co-precipitate can be at least partially removed by leaching the co-precipitate with a complexing agent that is specific for copper, and that does not complex the recovered precious metal. In the case of gold, examples of complexing agents that complex copper but not gold are ammonia, glycine and ethylenediamine. If this optional step is performed, the co-precipitate is then re-isolated, and the blue coloured copper ammonia solution is considered as waste and may optionally be discarded or recycled into the leaching process. This purification step is discussed further in Example 8.

Box 2b of FIG. 1 indicates another optional step wherein iron hydroxides and iron oxides, and any other metal oxides and metal hydroxides that may be present, are removed by contacting the co-precipitate with an acidic solution. Examples of suitable acids, which are diluted prior to use, include hydrochloric, nitric and sulfuric acids. Such hydroxides and oxides readily dissolve in acidic solutions, while gold, for example, in general additionally requires strong oxidative conditions in order to dissolve. It is noted that acidic solutions comprising combinations of nitric and hydrochloric acids may dissolve gold, and so are preferably not used in this step. As indicated at Box 3 of FIG. 1, the solid may be purified (or further purified) by electrowinning after redissolving, smelting or refining techniques, which optionally may be used in combination. Following such purification, a sample of substantially pure gold is obtained.

A description of how to prepare a gold salt from discarded gold jewelry that was authored by Norm Stanley has been published on the world wide web since Oct. 31, 2003. This description states that gold jewelry may be dissolved in aqua regia (1 part concentrated nitric acid in 3 parts concentrated hydrochloric acid), diluted, and treated with an acidic ferrous sulfate solution to precipitate gold in metallic form. The precipitate is reported to be exceedingly fine and there is a warning that it may lodge in the pores of a filter. Upon redissolution of the gold in metallic form in aqua regia, yellow crystals of chlorauric acid trihydrate are obtained. The Stanley process differs from the precious metal recovery method described herein. First, the Stanley process is performed in a strongly acidic solution that is estimated to be in a pH range, after the dilution step, of pH 0 to 1. Second, the gold precipitate is extremely fine and difficult to isolate. In contrast, the inventive method is conducted in a pH range substantially higher than 0-1. The aqueous solution preferably has a pH of about 7 or higher, e.g., about 7 to about 14. Also, according to the invention, gold precipitate is entrapped in an iron hydroxide or oxide precipitate that is facile to separate from solution, even in very dilute conditions. Thus, the inventive method reduces the gold ion to elemental gold and entraps the gold in a co-precipitate. The invention is advantageous in that it provides facile collection of precious metal.

An further advantage of the invention is low reagent cost. Another advantage is substantially complete recovery of precious metals even in dilute conditions. Another advantage is that non-hazardous waste is produced. A further advantage is the ability to reuse the barren filtrate of the co-precipitate collection step in a leaching circuit for many cycles. Another advantage is the lack of special conditions required for the recovery method. A further advantage is the consistency of the solid that is obtained; the co-precipitate is sufficiently dense that it may be readily separated from solution.

To exemplify the efficiency of the recovery method according to the invention, studies were conducted using five gold thiosulfate solutions, one gold thiocyanate solution, and one silver thiosulfate solution. Studies were conducted to determine the effect of several variables on the efficiency of the method at recovering gold and silver. In the case of the gold studies, these variables included: source of ferrous ion, amount of ferrous ion added, agitation time, concentration of additional sodium tetrathionate, concentration of additional sodium sulfate, and dissolved oxygen concentration. In the case of the silver studies, variables included agitation time and amount of ferrous ion added. Detailed procedural information of these studies is provided in the following working examples which illustrate embodiments of the invention.

WORKING EXAMPLES

It is important to point out that the invention is easily optimized to provide 100% precious metal recovery. Therefore, in certain studies set forth below, the inventor deliberately began with non-optimized conditions to test effects of different variables. That is, 100% recovery cannot be compared to 100% recovery.

Example 1

Filtration Apparatus

The filtration apparatus used throughout the examples was a vacuum filtration apparatus that had a suspension-receiving portion, a filtering portion, and a filtrate collection portion.

The suspension-receiving portion was a hollow glass cylinder with an open top face and an open bottom face. The suspension-receiving portion was adapted to be held by a clamp. When clamped, the bottom face was closed off by the filtering portion.

The filtering portion was a tapered glass cone with a larger diameter top end that was continuously attached to a circular metal screen of the same diameter and an open smaller diameter bottom end. The filtering portion was adapted to be clamped to the suspension-receiving portion.

Prior to clamping the suspension-receiving portion to the filtering portion, a circular piece of filter paper, having the same or larger diameter as the metal screen, was placed on the screen between the clamped portions.

A stainless steel springed C-clamp was placed on the suspension-receiving and the filtering portions. The two portions and the filter paper were then tightly held together such that any liquid contained in the suspension-receiving portion could only exit through the filtering portion.

A rubber sleeve was then placed around the filtering portion like a belt. The filtering portion was then tightly fitted into the open end of the filtrate-collection portion such that the rubber sleeve formed a seal between the glass walls of the filtering portion and the filtrate-collection portion.

The filtrate-collection portion was a thick walled glass Erlenmyer flask with an open top suitable for receiving the filtering portion. The filtrate-collection portion had a plastic bag suspended in it such that the neck of the bag was tightly sealed in the joint between the filtering portion and the filtrate-collection portion's rubber sleeve, so that in operation the filtrate collected in the plastic bag. To avoid contamination, plastic bags were used once and discarded. The Erlenmyer also had a tapered male joint with ridges protruding from its neck. A first end of a vacuum hose was attached to the male joint and a second end of the hose was attached to a glass T-joint. The opposing side of the T-joint was attached by vacuum hose to a vacuum pump (model G180DX, Fisher Scientific, Ottawa, Ontario, Canada). The third side of the T-joint pierced a stopper which was the lid of a thick walled glass trap. The trap was oriented downward to collect by gravity any liquid condensing in the vacuum hose.

Example 2

Preparation of Solutions

2A. Leachate

Leachate was prepared using municipally supplied water from the city of Kingston, Ontario, Canada. The water was not further purified by distillation or deionization. Ammonium thiosulfate (($NH_4$)$_2S_2O_3$, 99% pure) and copper sulfate ($CuSO_4 \cdot 5H_2O$, 98% pure) were purchased from Aldrich Chemical Company (Oakville, Ontario, Canada); ammonia ($NH_3$, 28%-30% in water) was purchased from Fisher Scientific (Ottawa, Ontario, Canada); all were used without further purification. The leachate was made to be 0.2 mol/L ammonium thiosulfate, 0.9 mol/L ammonia, and 300 mg/L copper sulfate. The leachate appeared as a pale blue transparent solution.

2B. Thiosulfate Solutions

Thiosulfate solutions were prepared for use in the preparation of pregnant solutions of Example 4B. The concentrations of thiosulfate and other components in these solutions were less concentrated than those of the leachate of Example 2A, and so they were stable and suitable for storing.

The thiosulfate solution for the 17.50 ppm gold ion solution (prepared from gold salt, see Example 4B) was 0.033 mol/L ammonium thiosulfate, 100 mg/L copper sulfate, and 0.12 mol/L ammonia.

The thiosulfate solution for the 5.30 ppm gold ion solution (prepared from gold salt, see Example 4B) was 0.067 mol/L ammonium thiosulfate, 240 mg/L copper sulfate, 0.12 mol/L ammonia.

Example 3

Gold Ore

The gold ore used herein was a silicate gold ore that was obtained from a gold mine. The ore sample had been analyzed for metal composition by atomic absorption spectrophotometry (model 3300, Perkin-Elmer, Wellesley, Mass., USA) and for sulfur and carbon composition on a Carbon and Dual Range Sulfur Analyzer (LECO Corporation, model SC-444DR, St. Joseph, Mich., USA). The following components of the ore were quantified: gold, 16.26 g/tonne; iron, 0.18% in oxide form; copper, 0.002% in oxide form; carbon, 0.19%; and sulfur, 0%. Prior to use, the gold ore was pulverized to 90% 200 mesh by dry grinding in a pulverizer (BICO model Omron H5CN, Burbank, Calif., USA).

Example 4

Preparation of Solutions

Example 4A

Preparation of Pregnant Solutions from Gold Ore

First and second pregnant solutions were prepared by adding a known weight of pulverized gold ore (see Example 3) to a known volume of leachate (see Example 2A) at room temperature. The two solutions had pulp densities of 10% (weight of gold ore/weight of leachate×100) and 25%. The concentrations of gold ion in these solutions was 1.93 ppm and 5.12 ppm, respectively.

A third solution was prepared using gold ore wherein the concentration of gold ion was increased by spiking the solution with gold salt. The pulp density of this solution was 50% and a known amount of sodium gold thiosulfate ($Na_3Au(S_2O_3)_2 \cdot H_2O$, 99.9% pure, Alfa Aesar, Ward Hill, Mass., USA) was added to the clear leachate after the ore had been filtered, as described below. The concentration of gold in this solution was 21.27 ppm.

The suspensions of gold ore in leachate were placed in capped glass jars (7 cm×9 cm). The jars were then clamped on an orbital shaker (Barnstead SHKE4000, Dubuque, Iowa, USA) and were shaken at 210 revolutions per minute (rpm) for three hours at room temperature which was approximately 21° C. The resulting suspensions were then filtered on the filtration apparatus (see Example 1) using one layer of filter paper (Whatman, 125 mm diameter, catalogue no. 1002 125, Qualitative 2). The resulting pregnant solutions were free of particulate matter and appeared as a pale blue transparent solution. The solutions were stored in capped glass flasks at room temperature. The concentration of gold ion in the pregnant solutions was determined by atomic absorption spectrophotometry "AAS" (model 2380, Perkin-Elmer, Wellesley, Mass., USA).

Example 4B

Preparation of Pregnant Solutions from Gold Salt

Fourth and fifth pregnant solutions were prepared wherein the source of the gold was a gold salt. These solutions were prepared by adding a known amount of gold sodium thiosulfate ($Na_3Au(S_2O_3)_2 \cdot XH_2O$, 99.9% pure, Alfa Aesar, Ward Hill, Mass., USA) to a known amount of thiosulfate solution (see Example 2B). The concentrations of gold ion, thiosulfate ion, copper ion and ammonia in these solutions were less than those of the solutions of Example 4A. These concentrations were chosen to emulate the concentration of gold found by industry in leachate of pre-oxidized double refractory gold ore. The concentration of gold in the fourth and fifth pregnant solutions was quantified by AAS to be 5.3 ppm and 17.50 ppm, respectively.

Example 4C

Preparation of Concentrated Ferrous Sulfate Solution

A 50 g/L solution of ferrous sulfate was prepared by weighing out 5 g of ferrous sulfate heptahydrate ($FeSO_4 \cdot 7H_2O$, 99.9% purity, Anachemia, Mississauga, Ontario, Canada) and adding it to 100 mL of tap water. The light green crystals readily dissolved after swirling the flask by hand for a few seconds. For several minutes the solution appeared as colourless and transparent. After a few minutes, the solution appeared as a suspension of very fine orange-brown precipitate. It is believed that the precipitate was a result of ferrous ion being oxidized by dissolved oxygen, and was ferric hydroxide ($Fe(OH)_3$). This suspension was capped and was swirled to create a homogeneous suspension prior to any aliquot being withdrawn. Ferrous sulfate solution was freshly prepared for each trial described herein and was not used after it was three hours old.

Example 5

Dissolved Oxygen Concentration

The concentration of dissolved oxygen in the leachates was maintained at about 0.3 ppm throughout the leaching methods in all trials unless otherwise specified. In trials using pregnant solutions that were made from leaching gold ore, the gold recovery trials were conducted immediately after filtering the ore. Therefore, the solutions were at approximately 0.3 ppm dissolved oxygen throughout the leaching process and the gold recovery method. The dissolved oxygen concentration's effect on the amount of gold recovered by the gold recovery method (see Example 6) was investigated in an study with four trials whose results are presented graphically in FIG. 7. The solutions for this study were de-oxygenated by bubbling with a stable gas flow of a combination of nitrogen and air for 30 minutes. The proportion of nitrogen in the bubbling gas was different for each of the four trials. In each case, the constant flow rate of total gas was 100 mL/min. The flow rates of each of the nitrogen and air components were controlled by separate flow meters (Model 150 mm, Gilmont Instruments, Racine, Wis., USA). The dissolved oxygen concentrations at the four proportions of nitrogen that were chosen, were known from a calibration curve that had been prepared previously. The calibration curve was prepared using trials of water and several different nitrogen proportions, while the total gas flow of 100 mL/min and the bubbling time of 30 minutes were held constant. The dissolved oxygen concentrations of the calibration curve trials were measured using an oxygen meter (Model 860, ORION®, available through Thermo Electron Corporation, Calgary, Alberta, Canada). For example, by bubbling a solution with 90% nitrogen gas and 10% air for thirty minutes, the dissolved oxygen concentration of the solution was 0.3 ppm.

The trials depicted in FIG. 7 were bubbled at 100 mL/min for 30 minutes so that the dissolved oxygen concentration was stable throughout the gold recovery method.

The trials to study the effect of dissolved oxygen on the gold recovery were conducted as per Example 6, wherein 50 mL of 1.93 ppm gold ion solution (prepared from gold ore in leachate) was de-oxygenated to a particular dissolved oxygen level. An aliquot of a freshly prepared ferrous sulfate solution (see Example 4C) was added. The solution was shaken for 5 seconds and was filtered as described above using a glass microfibre filter paper. The dissolved oxygen levels used in these trials varied from 0.1 to 8.6 ppm, as indicated in FIG. 7. The amount of gold recovered was quantified by AAS as described in Example 6.

Example 6

Gold Recovery

Studies were conducted to study the effects of several variables on the recovery of gold from pregnant solutions. In all cases, the trials were carried out in glass jars (7 cm×9 cm) that were fixed on an orbital shaker that was set at 210 rpm. Typically, 50 mL of pregnant thiosulfate solution (see Examples 4A and 4B) were measured by graduated cylinder and placed in a jar at room temperature. The pregnant solution appeared as a pale blue transparent solution and was free of solid. The solution/suspension of ferrous sulfate appeared as a pale orange-brown suspension. A glass pipette was used to transfer the desired volume of the 50 g/L ferrous sulfate solution (see Example 4C). The aliquot was added all at once to the pregnant solution. Immediately, the reaction solution appeared as a black suspension. The number of seconds that the solution was allowed to be shaken was measured using a stopwatch. Unless otherwise stated, the number of seconds that it was shaken after the aliquot was added was 5 seconds. After the shaking, the reaction solution was filtered under reduced pressure using the filtration apparatus described in Example 1 with a singe layer of a glass microfiber filter by Whatman. The time that it took to filter the 50 mL reaction solution was 10 to 30 seconds. During the filtration, the black solid co-precipitate was collected and isolated on the glass microfiber filter paper. When left in air to dry for several minutes, the black solid became orangey-brown in colour. The amount of gold in the black precipitate was quantified by AAS of a solution prepared by dissolving the solid using the aqua regia work up described in Example 7.

The filtrate collected in the plastic bag of the filtration apparatus (see Example 1) appeared as a pale blue transparent solution. When this filtrate was allowed to sit in open air for several minutes, an orange-brown precipitate settled at the bottom of the container. Prior to analysis of the filtrate for gold content by AAS, the filtrate was allowed to sit in open air for 30 minutes to 1 hour to allow any gold that may have co-precipitated to be oxidized and solubilized. Prior to the AAS analysis of the liquid filtrate, the orange-brown precipitate was discarded after having been separated from the liquid by centrifugation. In addition to the AAS analysis for gold content, the concentration of thiosulfate in the filtrate was determined by iodometric titration. The concentration of thiosulfate ion was reduced from its original concentration by 0.015 mol/L during leaching, whereas the concentration of thiosulfate ion did not change significantly during the gold recovery method.

Example 7

Quantification of Gold in Co-Precipitate

In all trials the amount of gold that was in the collected co-precipitate was determined by atomic absorption spectrophotometry (AAS) using a cathodic lamp. In order to prepare the co-precipitate for AAS, the filter paper with the blackish co-precipitate on it (see Example 6) was placed in a glass beaker and 20 mL of aqua regia solution (1 part concentrated nitric acid in 3 parts concentrated hydrochloric acid) was added to completely cover the filter paper. The aqua regia solution was then heated on a hot plate in a fume hood for approximately 10 minutes. After a few minutes of heating, all of the blackish solid that had been on the filter paper was dissolved. The clean filter paper was then removed from the solution with tweezers, and rinsed with deionized water. The rinsings were added to the aqua regia solution. The solution was then allowed to cool to ambient temperature. The solution was diluted to 50 mL, and AAS was used to quantify the amount of gold present in the solution. This value was then used to determine the amount of gold that had been in the co-precipitate.

Example 8

Purification of Co-Precipitate by Removal of Copper

In certain trials, the co-precipitate was purified by dissolving at least some copper that was contained therein. In these trials, the filter paper and black co-precipitate were placed in a 3 mol/L ammonia solution at room temperature. The co-precipitate was pounded with a glass rod to break it up into small pieces. These suspensions were then placed on the shaker bath and shaken at 210 rpm for 3 hours. The amount of solid in the suspension did not visibly diminish during the three hours; however, the solution became pale blue in colour. The solution was filtered using the filtration apparatus described in Example 1 and the copper concentration of the filtrate was determined by AAS.

Example 9

Purification of Co-Precipitate by Removal of Iron Hydroxides and Iron Oxides

Purification of the co-precipitate (see Example 6) was studied by dissolving iron oxides and iron hydroxides from the black co-precipitate. In these studies, the filter paper and the black co-precipitate were placed in a jar and were covered with 25 mL of 28-30% hydrochloric acid. Almost immediately, all of the solid that was visible to the eye dissolved. The remaining filter paper appeared clean of solid. At the concentrations of gold used in the trials described herein, the recovered solid gold was not visible to the naked eye; however, it is well known in the art that a 30% hydrochloric acid solution is not capable of dissolving solid gold. Thus this purification approach enables all of the hydroxides and oxides to be removed, leaving purified gold.

Example 10

Recycling of Leachate

The feasibility of recycling the barren filtrate of the gold collection step of Example 6, for use as leachate to leach gold from gold ore, was studied. In these trials, the solution used was the barren filtrate of the co-precipitate collection step of the gold recovery method that had been conducted using gold sodium thiosulfate in thiosulfate leachates (see Example 2A). This filtrate was allowed to sit in open air. Portions of the recycled solution were removed at 0 minutes, 30 minutes and 60 minutes after filtration of the co-precipitate. At each time point, the portion of recycled solution was then mixed with a sample of gold ore and the suspension was agitated on the orbital shaker for 3 hours. At 30 minutes and 3 hours after the leaching process had begun, 10 mL aliquots were removed and the amount of gold ion in the aliquots was determined by AAS. As seen in Table 1, the amount of gold recovered by the recycled leachate after 3 hours of leaching time was equivalent to the amount of gold leached from the same gold ore under the same conditions by fresh leachate. This study shows that the barren leachate may be cycled through the leaching process and gold recovery method again and again without significant loss of recovery efficiency.

Example 11

Study of Influence of Thiosulfate Degradation

The robust nature of the gold recovery method described herein was studied in trials wherein sodium tetrathionate ($Na_2S_4O_6 \cdot 2H_2O$, 98%, Alfa Aesar, Ward Hill, Mass., USA) and sodium sulfate ($Na_2SO_4$, 99%, Alfa Aesar, Ward Hill, Mass., USA) were added to the pregnant thiosulfate solution prior to the addition of the ferrous sulfate solution. These compounds are degradation products of thiosulfate, and these studies were of interest since the concentrations of such products are expected to increase in the leachate as it is used and reused. These chemicals were added in solid form to the pregnant thiosulfate solutions and dissolved readily. The influence that additional sodium tetrathionate and additional sodium sulfate had on the amount of gold recovered is presented graphically in FIGS. 5 and 6. In both cases, increased concentration improved the amount of gold recovered. These studies show that the barren solution of the co-precipitate collection step may be reused in the leaching process without apparent loss of efficiency of recovering gold.

Example 12

Gold Recovery from Thiocyanate Solution

A study was conducted to determine the efficiency of the recovery method on a thiocyanate solution. The pregnant solution was prepared by dissolving sodium gold thiocyanate ($Na_3Au(S_2O_3)_2 \cdot H_2O$, 99.9% pure, Alfa Aesar, Ward Hill, Mass., USA) in 50 mL water and adding 0.3 g $NH_4SCN$ (Fisher Scientific). The solution appeared colourless, transparent and stable. The pH of the solution was adjusted to pH 10 by adding ammonia. The gold recovery method was performed as described in Example 6, with an aliquot volume of 2 mL of fresh 50 g/L ferrous sulfate solution and an agitation time of 5 seconds. Thus the amount of ferrous salt added was 2 g/L. The recovered co-precipitate was found by AAS to have 99.8% of the gold, and the barren filtrate was found to contain 0.02 mg/L of gold. Thus, the precious metal recovery method was shown to be very effective at recovering gold from thiocyanate solutions.

Example 13

Study of Silver Recovery

Studies were conducted to determine the efficacy of the recovery method described herein in recovering silver from thiosulfate solution. A jar containing a 50 mL solution of silver ions that was 80.26 mg/L $AgNO_3$, 0.2 mol/L ammonium thiosulfate, 300 mg/L copper sulfate, and 0.9 mol/L ammonia was clamped onto a shaker bath and shaken at 210 rpm in open air at ambient temperature. An aliquot of 50 g/L ferrous sulfate solution (see Example 4C) was added. A black co-precipitate formed immediately. The reaction solution was agitated for a selected amount of time, and was filtered (see Example 6 for procedural details). The amounts of silver in the co-precipitate and barren filtrate were determined by AAS. The percentage of silver recovered was 99.88% (at 5 seconds agitation time and a ferrous sulfate solution aliquot volume of 2 mL); 99.80% (at 30 seconds agitation time and a ferrous sulfate solution aliquot volume of 2 mL); and 99.93% (at 5 seconds agitation time and a ferrous sulfate solution aliquot volume of 4 mL). These studies show that the recovery method is efficient at recovering silver from solution.

All scientific and patent publications cited herein are hereby incorporated in their entirety by reference.

It will be understood by those skilled in the art that this description is made with reference to the preferred embodiments and that it is possible to make other embodiments employing the principles of the invention which fall within its spirit and scope as defined by the claims appended hereto.

TABLE 1

Study of Effectiveness of Reuse of Gold Recovery Filtrate at Leaching Gold from Gold Ore.

| Solution | Percentage of gold leached after 30 min of agitation | Percent of gold leached after 3 hours of agitation |
| --- | --- | --- |
| Fresh leaching solution | 75.2 | 94.2 |
| Recycled leaching solution, used immediately after gold recovery | 58 | 94.6 |
| Recycled leaching solution, used 30 minutes after gold recovery | 71.8 | 93.6 |
| Recycled leaching solution, used 60 minutes after gold recovery | 74.6 | 93.9 |

TABLE 2

Study of the Effect of Thiosulfate Decomposition Products on Gold Recovery

| Au in pregnant solution (ppm) | Additional Sodium Sulfate (g/L) | Additional Sodium Tetrathionate (g/L) | Au in barren solution (ppm) | Gold recovery (%) |
| --- | --- | --- | --- | --- |
| 17.5 | — | 0 | 0 | 100 |
| 17.5 | — | 1.2 | 0 | 100 |
| 17.5 | — | 3.2 | 0 | 100 |
| 17.5 | 0 | — | 0 | 100 |
| 17.5 | 12 | — | 0.03 | 99.8 |
| 17.5 | 32 | — | 0 | 100 |
| 5.3 | — | 0 | 0 | 100 |
| 5.3 | — | 2 | 0.17 | 96.8 |
| 5.3 | — | 4 | 0.11 | 97.9 |
| 5.3 | 0 | — | 0 | 100 |
| 5.3 | 20 | — | 0 | 100 |
| 5.3 | 40 | — | 0 | 100 |

REFERENCES

Fleming, C. A., McMullen, J., Thomas, K. G., Wells, J. A. "Recent advances in the development of an alternative to the cyanidation process: Thiosulfate leaching and resin in pulp," *Minerals & Metallurgical Processing* 20(1): 1-9 (2003).

Muir, D. M.; Aylmore, M. G. "Thiosulfate leaching of gold: A review," *Minerals Engineering* 14(2): 135-174 (2001).

Muir, D. M.; Aylmore, M. G. "Thiosulfate as an alternative to cyanide for gold processing—issues and impediments," *Mineral Processing and Extractive Metallurgy (Trans. Inst. Min. Metall. C)* 113: C2-C12 (March, 2004).

Nicol, M.; O'Malley, G. P. "Recovery of gold from thiosulfate solutions and pulps with ion-exchange resins," (eds. C. A. Young, L. G. Twidwell and C. A. Anderson) *Cyanide: social, industrial and economic aspects*, Warrendale, Pa., TMS, 469-483 (2001).

Thomas, K. G.; Fleming, C.; Marchbank, A. R.; Dreisinger, D. "Gold recovery from refractory carbonaceous ores by pressure oxidation, thiosulfate leaching, and resin-in-pulp adsorption," U.S. Pat. No. 5,536,297 (1998).

Wan, R. Y.; Le Vier, M.; Clayton, R. B. "Hydrometallurgical process for the recovery of precious metal values from precious metal ores with thiosulfate lixiviant," U.S. Pat. No. 5,354,359 (1994).

The invention claimed is:

1. A method for recovering precious metal in solid form from an aqueous solution containing precious metal ions and lixiviant, comprising the steps of:
   combining an aqueous solution containing precious metal ions and lixiviant with ferrous ions, wherein the aqueous solution, the resulting mixture or both is about pH 7 or higher; and without using hydrogen gas,
   collecting solid containing precious metal.

2. The method of claim 1, wherein the aqueous solution, the resulting mixture or both is about pH 7 to about pH 14.

3. The method of claim 2, wherein the aqueous solution, the resulting mixture or both is about pH 8 to about pH 12.

4. The method of claim 1, further comprising the step of adding base to the aqueous solution containing precious metal and lixiviant prior to combining said solution with ferrous ions.

5. The method of claim 4, wherein after said addition of base, the aqueous solution, the resulting mixture or both is about pH 7 to about pH 14.

6. The method of claim 5, wherein after said addition of base, the aqueous solution, the resulting mixture or both is about pH 8 to about pH 12.

7. The method of claim 4, wherein the base is at least one of ammonia, NaOH, KOH, CaO, Ca(OH)$_2$, CaCO$_3$, Na$_2$CO$_3$, KCO$_3$.

8. The method of claim 1, wherein the precious metal is gold.

9. The method of claim 1, wherein the precious metal is silver.

10. The method of claim 1, wherein the lixiviant is thiosulfate.

11. The method of claim 1, wherein the lixiviant is thiocyanate.

12. A method for recovering silver in solid form from an aqueous solution containing silver ions, comprising the steps of combining an aqueous solution containing silver ions of about pH 7 or higher with ferrous ions, and without using hydrogen gas, collecting solid containing silver.

13. The method of claim 12, wherein the aqueous solution is about pH 7 to about pH 14.

14. The method of claim 1, further comprising the step of purifying elemental precious metal from the solid containing precious metal.

15. The method of claim 14, wherein said purifying step comprises treating the solid with an acidic solution.

16. The method of claim 15, wherein the acidic solution comprises hydrochloric acid, nitric acid, sulfuric acid, hydrochloric and sulfuric acids, or nitric and sulfuric acids.

17. The method of claim 14, wherein said purifying step comprises at least one of electrowinning after redissolving, smelting or refining.

18. The method of claim 14, wherein the aqueous solution further contains copper ions and said purifying step comprises treating the solid containing precious metal with a copper complexing agent and removing a resulting copper complex.

19. The method of claim 18, wherein the copper complexing agent comprises at least one of ammonia, glycine, ethylenediamine.

20. The method of claim 1, further comprising agitating the mixture.

21. The method of claim 1, further comprising the step of de-oxygenating the aqueous solution or the aqueous solution that has been combined with ferrous ions.

22. The method of claim 21, wherein de-oxygenating comprises bubbling with a gas that has substantially no oxygen.

23. The method of claim 21, wherein de-oxygenating comprises placing the aqueous solution under reduced pressure.

24. The method of claim 21, wherein de-oxygenating comprises covering the aqueous solution, the aqueous solution that has been combined with ferrous ions, or both with a blanket of gas that has little to no oxygen.

25. The method of claim 1, wherein an excess of Fe(II) or other reducing agent is provided in the aqueous solution or in the mixture.

26. The method of claim 12, further comprising the step of purifying elemental silver from the solid containing silver.

27. A method for recovering precious metal in solid form from an aqueous solution containing precious metal ions and lixiviant, comprising:
   adding base to an aqueous solution containing precious metal ions and lixiviant;
   then combining the aqueous solution with ferrous ions, wherein the aqueous solution, the resulting mixture or both is about pH 7 or higher; and
   collecting solid containing precious metal.

28. The method of claim 27 wherein after addition of the base, the pH of the aqueous solution, the resulting mixture, or both is from about pH 7 to about pH 14.

29. The method of claim 27 wherein after addition of the base, the pH of the aqueous solution, the resulting mixture, or both is from about pH 8 to about pH 12.

30. The method of claim 27 wherein the base is at least one of ammonia, NaOH, KOH, CaO, Ca(OH)$_2$, CaCO$_3$, Na$_2$CO$_3$, KCO$_3$.

31. The method of claim 27 wherein the lixiviant is thiocyanate.

32. The method of claim 27 wherein the aqueous solution further comprises copper ions, and further comprising:
   purifying elemental precious metal from the solid by;
   treating the solid with a copper complexing agent; and
   removing a resulting a copper complex.

33. The method of claim 32, wherein the copper complexing agent comprises at least one of ammonia, glycine, ethylenediame.

34. The method of claim 27, further comprises de-oxygenating the aqueous solution or the aqueous solution that has been combined with ferrous ions.

35. The method of claim 34, wherein de-oxygenating comprises bubbling with a gas that has substantially no oxygen.

36. The method of claim 34, wherein de-oxygenating comprises placing the aqueous solution under reduced pressure.

37. The method of claim 34, wherein de-oxygenating comprises covering the aqueous solution, the aqueous solution that has been combined with ferrous ions, or both with a blanket of gas that has little to no oxygen.

* * * * *